United States Patent [19]
Bhookmohan et al.

[11] Patent Number: 5,706,694
[45] Date of Patent: Jan. 13, 1998

[54] PLATE CLUTCH ASSEMBLY HAVING A TORQUE TRANSMITTING MEMBER WITH AN IMPROVED LUBRICATION CONTROLLING DAM STRUCTURE AND METHOD OF MAKING THE SAME

[75] Inventors: Chabi Bhookmohan, Thornhill; Harold Vahle, Newmarket; Saverio Bozzo, Richmond Hill, all of Canada

[73] Assignee: Tesma International Inc., Concord, Canada

[21] Appl. No.: 699,336

[22] Filed: Aug. 19, 1996

[51] Int. Cl.$^6$ ................................................. B21K 21/12
[52] U.S. Cl. .................. 72/325; 29/893.34; 192/70.12
[58] Field of Search .................. 72/325, 358; 29/893.33, 29/893.34; 74/467, 468; 192/70.12, 70.2

[56] References Cited

U.S. PATENT DOCUMENTS

| | | |
|---|---|---|
| 4,860,861 | 8/1989 | Gooch et al. . |
| 4,934,216 | 6/1990 | Sandel et al. . |
| 5,152,061 | 10/1992 | Himmeroeder . |
| 5,305,663 | 4/1994 | Leonard et al. . |
| 5,305,863 | 4/1994 | Gooch et al. . |
| 5,503,604 | 4/1996 | Pierce et al. . |

*Primary Examiner*—Lowell A. Larson
*Attorney, Agent, or Firm*—Cushman Darby & Cushman IP Group of Pillsbury Madison & Sutro LLP

[57] ABSTRACT

A torque transmitting member for use in a plate clutch assembly includes a gear having interior and exterior splines. The exterior splines define exterior tooth surfaces, and the interior splines define corresponding interior trough surfaces. The clutch plate assembly includes an outer annular member having a annular section radially spaced from the splines of the torque transmitting member so as to define an annular space therebetween. One group of clutch plates is keyed to the outer annular member, and another group intermeshes with the external tooth surfaces of the torque transmitting member. An opening extending from an interior trough surface to the exterior tooth surface allows a liquid lubricant fed into the interior trough surfaces to be directed radially outwardly by centrifugal force into the plurality of parallel clutch plates. A lubricant controlling dam structure associated with each opening is provided at a free end of the inner splines of the torque transmitting member and extends inwardly from at least a portion of the inner trough surface. The dam structure is formed at a position radially inwardly from the exterior tooth surfaces, leaving the exterior tooth surface unaffected by the formation thereof. In a method of forming the torque transmitting member, the dam structure is formed by a dam structure forming tool having a dam forming periphery constructed and arranged to form the dam structures, preferably all simultaneously, at a position disposed radially inwardly from the exterior tooth surfaces.

4 Claims, 7 Drawing Sheets

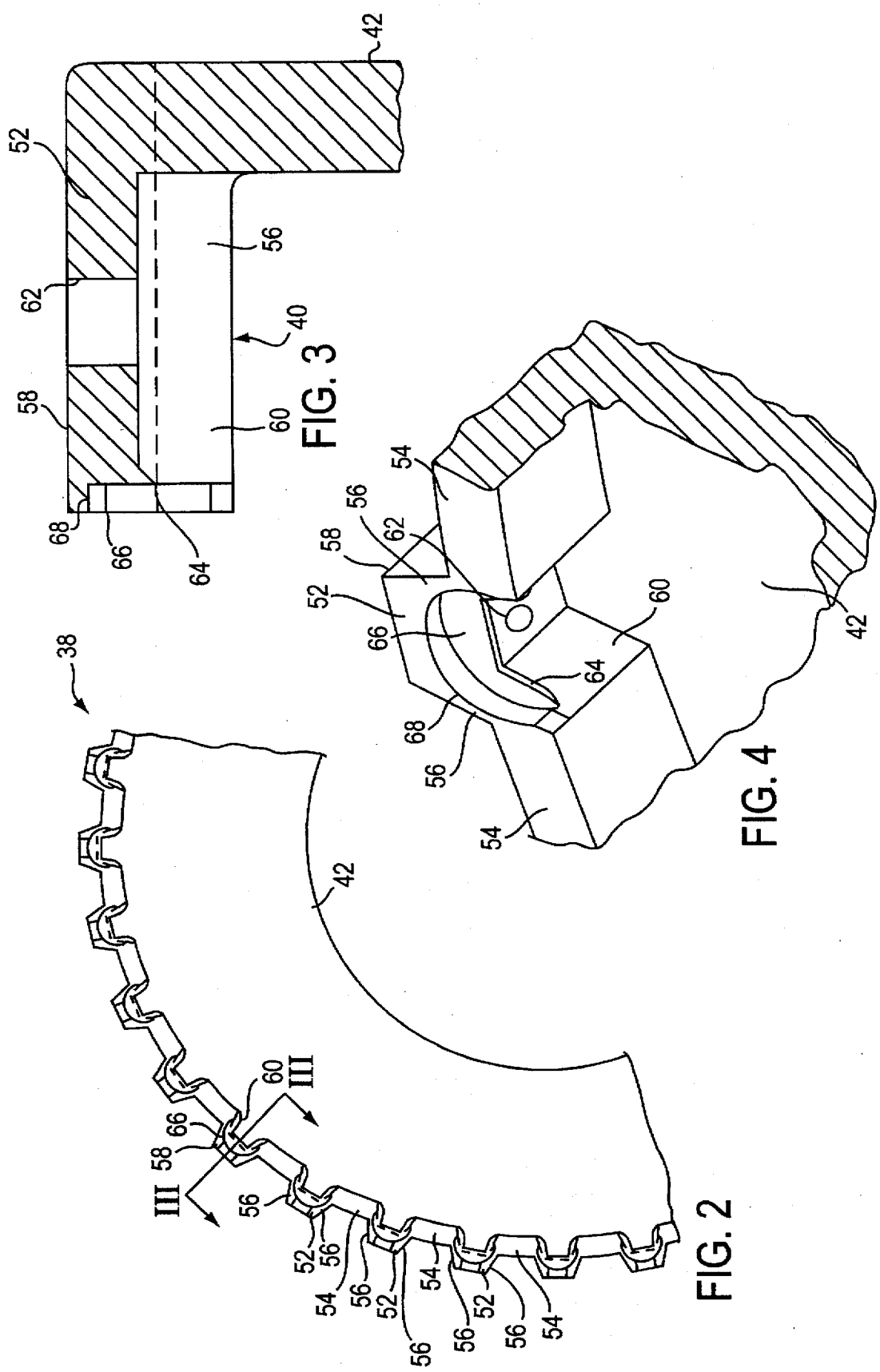

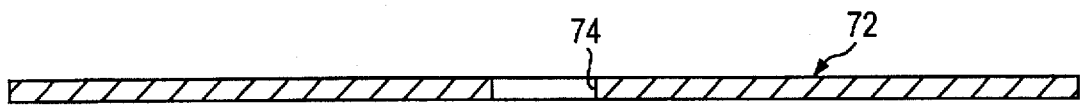
FIG. 5
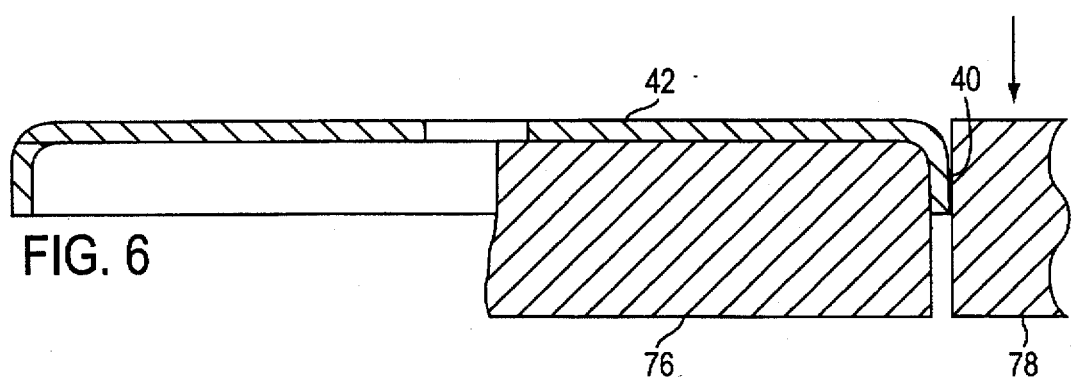
FIG. 6
FIG. 7
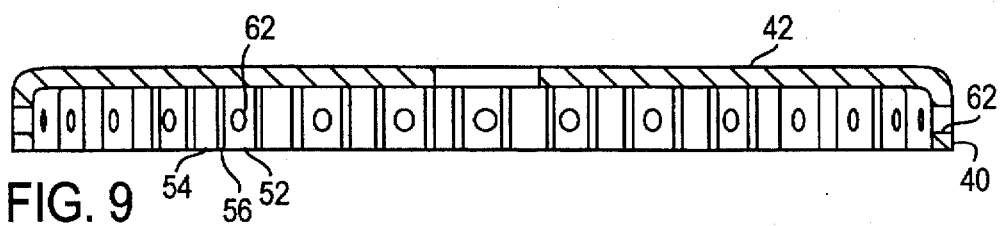
FIG. 9

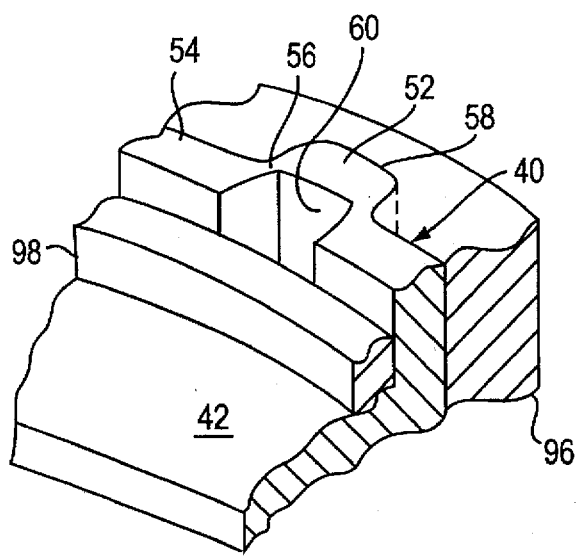
FIG. 14
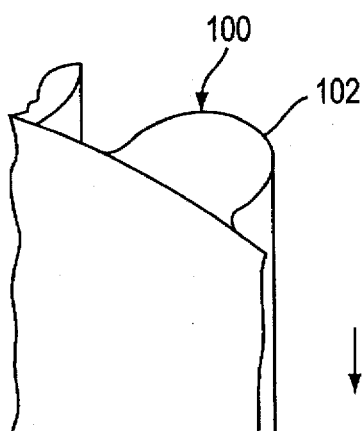
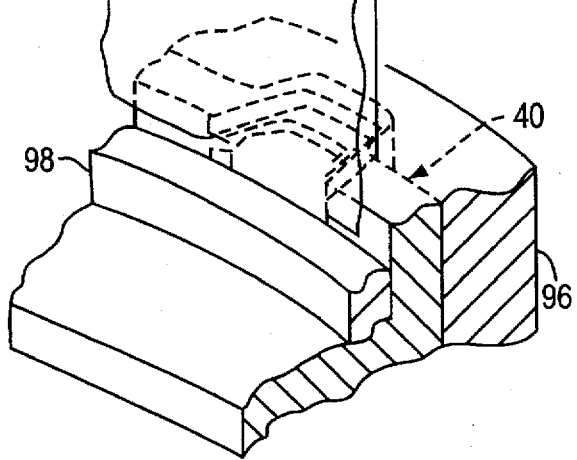
FIG. 15
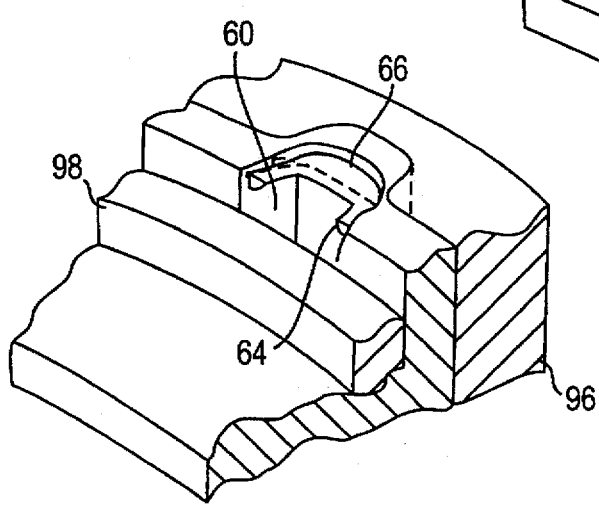
FIG. 16

PLATE CLUTCH ASSEMBLY HAVING A TORQUE TRANSMITTING MEMBER WITH AN IMPROVED LUBRICATION CONTROLLING DAM STRUCTURE AND METHOD OF MAKING THE SAME

BACKGROUND OF THE INVENTION

1. Field of the Invention

The present invention relates to a plate clutch assembly having a torque transmitting member including an improved lubrication controlling dam structure and a method for making the torque transmitting member having the improved lubrication controlling dam structure.

2. Background of the Invention

A typical plate clutch assembly used, for example, in an automatic transmission of an automobile, includes an inner gear having external teeth, or splines, and an outer annular gear having internal teeth, or splines. The internal teeth of the outer gear are displaced radially outwardly from the external teeth of the inner gear so as to form an annular space therebetween. The inner and outer gears function as torque transmitting members.

A first set of clutch plates is keyed to the internal teeth of the outer annular gear so as to prevent rotation of the first set of clutch plates with respect to the outer annular gear. A second set of clutch plates is intermeshed with the outer teeth of the inner gear in a manner so as to permit axial movement of the second set of clutch plates with respect to the outer teeth. The first and second sets of clutch plates are disposed in the annular space between the inner and outer gear in a parallel fashion. The clutch plates are arranged so as to alternate between a clutch plate from the first set and a clutch plate from the second set. One set of the clutch plates is a driven set, and the other set of the clutch plates is a driving set. The clutch plates are constructed and arranged for axial movement with respect to one another between a relative slipping relationship and an engaged relationship. When the clutch plates move axially from the relative slipping relationship to the engaged relationship, torque from the driving set is transferred to the driven set.

When the clutch plates are in the relative slipping relationship the driving clutch plates continue to rotate with respect to the driven clutch plates. To minimize wear on the clutch plates, which can occur while they are in a relative slipping relationship, it is desirable to provide a liquid lubricant between adjacent faces of the clutch plates.

Liquid lubricant can be provided by feeding the lubricant into trough surfaces defined on the interior side of the external teeth of the inner gear and permitting the lubricant to flow radially outwardly through an opening extending from the inner trough surface to an exterior tooth surface, the lubricant being forced by the centrifugal movement of the inner gear. The liquid lubricant will also flow axially along the inner trough surface as well.

To control axial movement of the lubricant within the trough of the inner gear, and to prevent the liquid lubricant from flowing past the axial end of the trough, a dam structure proximate the axial end of the trough can be provided.

In prior art splined gears, this dam structure was provided by merely bending a portion of the axial end of each spline radially inwardly, as shown in FIGS. 17 and 18. In FIG. 17, there is shown a cross-sectional view of a prior art inner gear, or torque transmitting member, 138. The gear 138 has splines 130, which include an exterior tooth surface 158 and an interior trough surface 160. As shown in FIG. 18, a dam structure 164 is provided at the axial end of the trough surface 160. The dam structure 164 is formed by bending an axial end 162 of the spline 130 radially inwardly.

The oil dam structure of the prior art has a number of disadvantages associated with it. First, by bending the axial end 162 of the spline 130 downwardly to form the dam, the axial length of the exterior tooth surface 158 of the spline is reduced, as compared to the axial length of the interior trough surface 160, thus decreasing the area of the spline for engaging clutch plates. Second, in the splined gear of the prior art, the oil dams are formed in a separate machine in addition to the machine in which the splined gear itself is manufactured.

In prior art splined gears, the oil dams are formed by the "Koppy" process, wherein only two splines at a time are bent inwardly to form an oil dam. In the process, the wheel is indexed at 18 second intervals. Therefore, on average, each dam requires 9 seconds to form. Furthermore, because of the many additional steps required to form all of the dam structures, high dimensional accuracy is difficult to achieve because of the variances introduced with each additional step in the manufacturing process. A lack of high dimensional accuracy can lead to inconsistent flow of liquid lubricant to the clutch plates, which can lead to earlier failures thereof. In addition, the equipment necessary for the Koppy-Slaughter process is quite expensive and requires large capital investment.

Accordingly, it is desirable to provide a torque transmitting member for use in a plate clutch assembly which is more cost effective and has greater dimensional accuracy than torque transmitting members of the prior art.

SUMMARY OF THE INVENTION

A torque transmitting member having an improved lubrication controlling dam structure is provided in which all of the dam structures can be formed simultaneously by a single stamping tool in a process that can be incorporated into the forming process for manufacturing the member. The torque transmitting member of the present invention now requires less capital investment to manufacture as compared to prior art devices and less manufacturing time than the torque transmitting member of the prior art. Thus, the torque transmitting member of the present invention and the method of forming it are more cost effective.

Further, because all the dam structures are formed in a single step, the torque transmitting member of the present invention has higher dimensional accuracy than prior art devices.

Finally, in the torque transmitting member of the present invention, the dam structure is created without sacrificing any length of the exterior surfaces of the splines.

According to the present invention, a plate clutch assembly is provided which includes a rotary hub, or torque transmitting member, constructed and arranged to be rotated about a rotary axis, the rotary hub having an annular wall. An outer annular member is provided which includes an annular section spaced radially outwardly from the annular wall of the rotary hub so as to define an annular space therewith. A plurality of parallel annular clutch plates are disposed within the annular space for axial movement with respect to one another between a relative slipping relationship and an engaged relationship.

A first group of spaced clutch plates have their exterior peripheries keyed to the annular section of the outer annular member to prevent relative rotation with respect thereto.

The annular wall of the rotary hub includes a free end and is formed to provide a series of outer wall sections extending axially to the free end, a series of inner wall sections extending axially to the free end, and opposite side wall sections interconnecting adjacent inner and outer wall sections. The outer wall sections and the adjacent side wall sections define a series of axially extending exterior teeth surfaces and corresponding interior trough surfaces, which are circumferentially separated from one another by the inner wall sections.

A second group of spaced annular clutch plates have inner peripheries shaped to move axially along the exterior teeth surfaces in meshed relation thereto.

The outer wall sections are provided with openings extending radially therethrough for enabling a liquid lubricant fed to the interior trough surfaces to flow outwardly therethrough by centrifugal force to provide lubricant between adjacent faces of the plurality of parallel annular clutch plates.

The free end of the annular wall, at the outer wall section and adjacent side wall sections thereof, includes portions radially inwardly of the exterior teeth surfaces deformed to provide dam structures extending radially inwardly of the interior trough surfaces of the outer wall section and extending to the interior trough surfaces of the adjacent side wall sections to control the axial flow of the liquid lubricant and retain the liquid lubricant against axial movement beyond the free end of the annular wall.

A method for forming a rotary hub according to the present invention comprises cold forming a circular piece of sheet metal into a preform having a central wall and an annular wall extending axially from an outer periphery of the central wall.

The external and internal teeth, or splines, are formed in the annular wall of the preform by a cam action, horizontal stroke forming operation in which the annular wall is pressed between inner and outer die members having intermeshing tooth-forming peripheries.

The radially extending openings are then formed through the outer wall sections of the annular wall.

Finally, the annular wall is secured in an annular wall holding unit and the free end of the annular wall is stamped with a dam structure forming tool at positions spaced radially inwardly from the exterior tooth surfaces to form the dam structures associated with each exterior tooth surface and corresponding trough surface and extending radially inwardly of the interior trough surfaces of the outer wall section and extending to the interior trough surfaces of the adjacent side wall.

In a preferred embodiment, the dam structure forming tool comprises a plunger member having a dam forming periphery constructed and arranged to form all of the associated dam structures simultaneously.

These and other features of the present invention will become more apparent during the course of the following detailed description and appended claims. The invention may be best understood with reference to the accompanying drawings wherein an illustrative embodiment is shown.

BRIEF DESCRIPTION OF THE DRAWINGS

FIG. 2 is a partial plan view of a torque transmitting member with an improved lubrication controlling dam structure according to the present invention;

FIG. 3 is a partial cross section taken along the line III—III in FIG. 2;

FIG. 4 is a partial perspective view of the gear tooth and corresponding trough of the torque transmitting member of the present invention;

FIG. 5 is a cross sectional view illustrating a first step in the method of making a torque transmitting member according to the present invention;

FIG. 6 is a cross sectional view illustrating a second step in the method of making the torque transmitting member;

FIG. 7 is a cross sectional view illustrating a third step in the method of making the torque transmitting member;

FIG. 9 is a cross sectional view illustrating a fifth step in the method of making the torque transmitting member;

FIG. 14 is a partial perspective view illustrating the holding components employed in forming the improved dam structure during the sixth step in the method of making the torque transmitting member;

FIG. 15 is a partial perspective view illustrating the formation of the dam structure during the sixth step in the method of making the torque transmitting member;

FIG. 16 is a partial perspective view illustrating the improved dam structure after the formation thereof during the sixth step in the method for making the torque transmitting member;

DETAILED DESCRIPTION OF THE INVENTION

Figure 1:
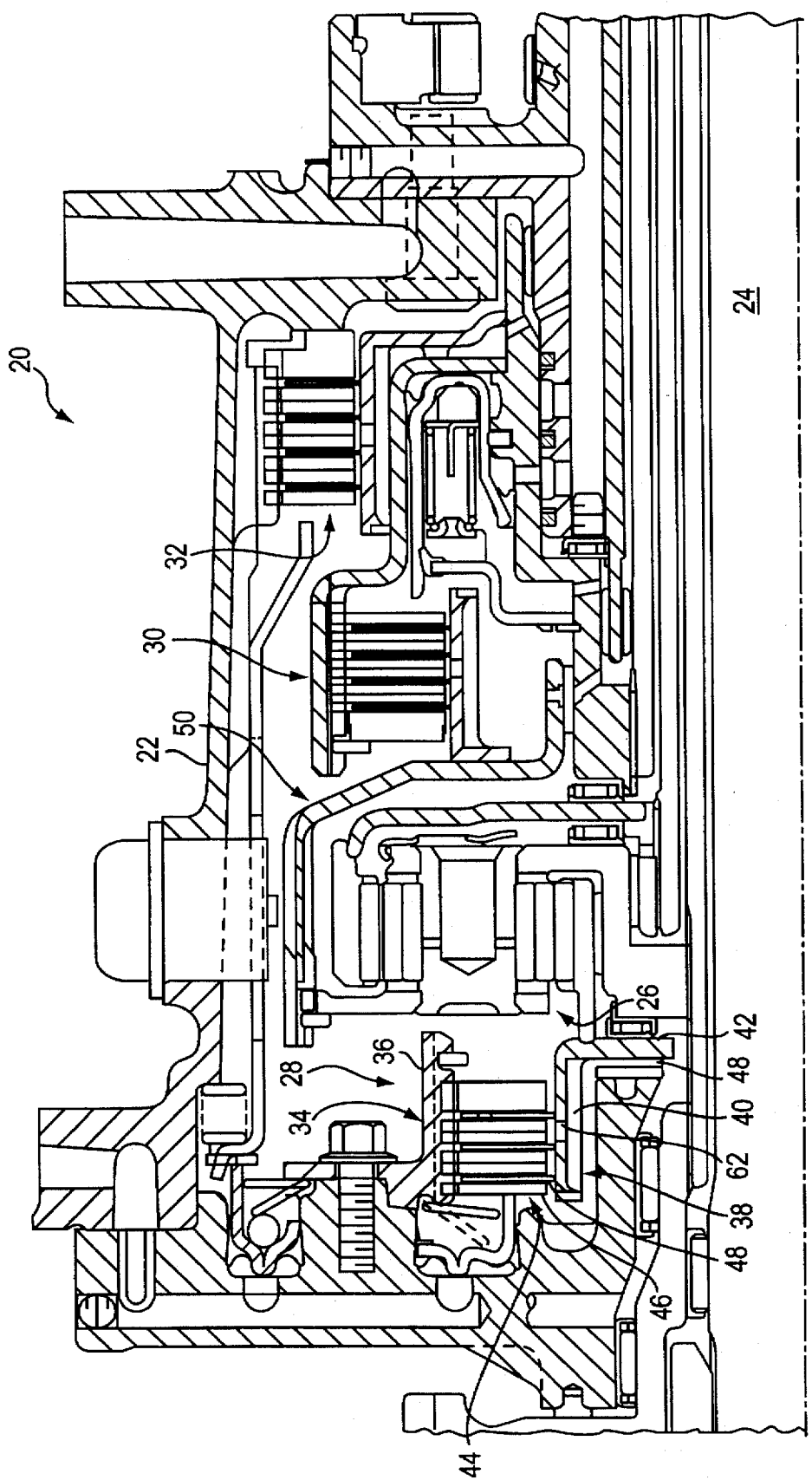
FIG. 1 is a partial cross section of a typical automatic transmission including plate clutch assemblies having torque transmitting members with an improved lubrication controlling dam structure according to the present invention.

A typical automatic transmission for an automobile in which clutch plate assemblies according to the present invention may be employed is shown in FIG. 1. The transmission 20 typically includes a drive shaft 24 and a housing 22. Typically, one or more planetary gear systems 50 are also included in the transmission 20. In the transmission 20 shown in FIG. 1, three clutch plate assemblies 28, 30, and 32 are shown.

Other transmissions in which the clutch plate assembly of the present invention may be employed include those transmissions described in U.S. Pat. No. 5,503,604 to Pierce et al.; U.S. Pat. No. 4,934,216 to Sandel et al.; and U.S. Pat. No. 5,305,663 to Leonard et al.; assigned to the Ford Motor Company of Dearborn, Mich. and U.S. Pat. Nos. 4,860,861 and 5,305,863 to Gooch et al. assigned to the Eaton Corporation of Cleveland, Ohio. The detailed description of the clutch plate assembly according to the present invention will be made with reference to clutch plate assembly 28, clutch plate assemblies 30 and 32 having similar features. Clutch plate assembly 28 includes an inner torque transmitting member 38. Inner torque transmitting member 38 typically comprises a rotary hub or an exteriorly toothed inner gear. Inner torque transmitting member 38 preferably includes a central wall portion 42 extending radially from an axis of rotation of the member and an annular wall 40 formed integrally with the outer periphery of the central wall 42 and extending generally axially therefrom.

Further details of the construction of the inner torque transmitting member 38 are shown in FIGS. 2–4. Central wall 42 may comprise a radially extending annular wall as shown, or may, for example, comprise a series of spokes extending radially from a central hub. Annular wall 40 has a free end 68 opposite the central wall 42. Torque transmitting member 38 is formed to have a series of outer wall sections 52 extending axially from the central wall to the free end. Torque transmitting member 38 further includes a series of inner wall sections 54 and opposing side wall sections 56 interconnecting adjacent inner and outer wall sections.

Outer wall sections 52 and adjacent side wall sections 56 define interior and exterior splines, or teeth, which include exterior tooth surfaces 58 and corresponding interior trough surfaces 60. Each external tooth surface 58 and corresponding interior trough surface 60 is circumferentially separated from adjacent exterior tooth surfaces and corresponding interior trough surfaces by adjacent inner wall sections 54.

Each outer wall section 52 has formed therein a radially extending opening 62. The purpose of the opening 62 is to permit a lubricating liquid to pass therethrough under the influence of a centrifugal force caused by the rotation of torque transmitting member 38. As shown in FIG. 1, an opening such as passage 48 is provided to feed the lubricating liquid therethrough and toward the interior trough of torque transmitting member 38.

The free end 68 of torque transmitting member 38 is deformed so as to form a stamp depression 66 in the vicinity of each tooth and corresponding trough defined by the outer walls 52 and side walls 56. When stamp depression 66 is formed, a portion of the material is bulged so as to form dam structure 64 extending across the interior trough surface defined by the outer wall section 52 and at least partially along the interior trough service defined by opposing side wall sections 54. The purpose of dam structure 64 is to control and retain a liquid lubricant that is fed toward opening 62 by centrifugal force so as to prevent the lubricant from spilling past the free end 68 of the annular wall 40.

As is evident from FIGS. 3 and 4, stamp depression 66 is spaced from exterior tooth surface 58. Thus, the axial length of exterior tooth surface 58 is unaffected.

As shown in FIG. 1, clutch plate assembly 28 further includes an outer torque transmitting member 34. Outer torque transmitting member 34 comprises an outer annular member or outer internally toothed annular gear. Outer torque transmitting member 34 includes an annular section 36 that is radially spaced from the annular wall 40 of inner torque transmitting member 38 so as to define an annular space therebetween.

A plurality of parallel annular clutch plates 44 are disposed in the annular space defined between annular section 36 and annular wall 40. The clutch plates 44 are disposed in a conventional manner well known in the art for axial movement with respect to one another between a relative slipping relationship therebetween and an engaged, relatively non-slipping relationship therebetween. The clutch plates 44 include two groups of plates: one group will be a driven set of clutch plates and the other will be a driving set of clutch plates.

Clutch plate assembly 28 includes a first group of clutch plates 46, the outer periphery thereof being keyed to the annular section 36 of the outer torque transmitting member 34 to prevent relative rotation with respect thereto about the axis of rotation of the outer torque transmitting member 34. A second group of clutch plates 48 have an inner periphery thereof shaped to mesh with the exterior tooth surfaces 58 of the teeth of the inner torque transmitting member 38 while allowing axial movement of the second group of clutch plates 48 with respect thereto.

A lubricating liquid, which is fed through opening 62 under the centrifugal force of the rotation of inner transmitting member 38, flows amongst and between the adjacent faces of the clutch plates 44 so as to lubricate the clutch plates.

Having described the preferred embodiment of the clutch plate assembly of the present invention, and more particularly the inner torque transmitting member having an improved liquid lubricant controlling dam structure, the preferred method of forming the inner torque transmitting member will now be described with reference to FIGS. 5–15.

As shown in FIG. 5, a flat metal blank 72 is provided. Blank 72 is preferably comprised of a steel capable of being cold formed and is preferably circular and may be stamped from a continuous sheet of steel. Blank 72 is also preferably provided with a centering hole 74.

In a first forming step, shown in FIG. 6, blank 72 is placed on a circular support member 76. A preform is created by moving outer annular plunger 78 in a vertical linear stroke fashion with respect to circular support member 76 so as to engage an outer annulus of the blank 72 and cold form the outer annulus into an axially extending flange, or annular wall 40, extending axially from the outer periphery of a central wall 42 thereof.

In a third step shown in FIG. 7, annular wall 40 of the preform is preferably reformed to produce a sharp bend between central wall 42 and annular wall 40. Annular wall 40 is reformed by the opposed relative lateral forming motion between a circular support member 80 and an outer die member 82.

Figure 8A:
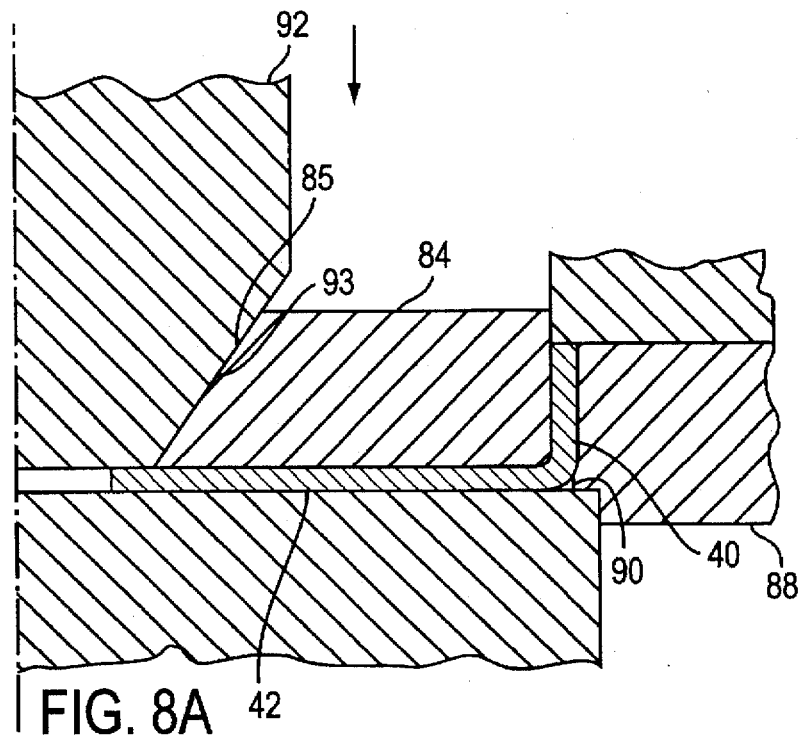
FIGS. 8A and 8B are partial cross sectional views illustrating a fourth step in the method of making the torque transmitting member.
Figure 8B:
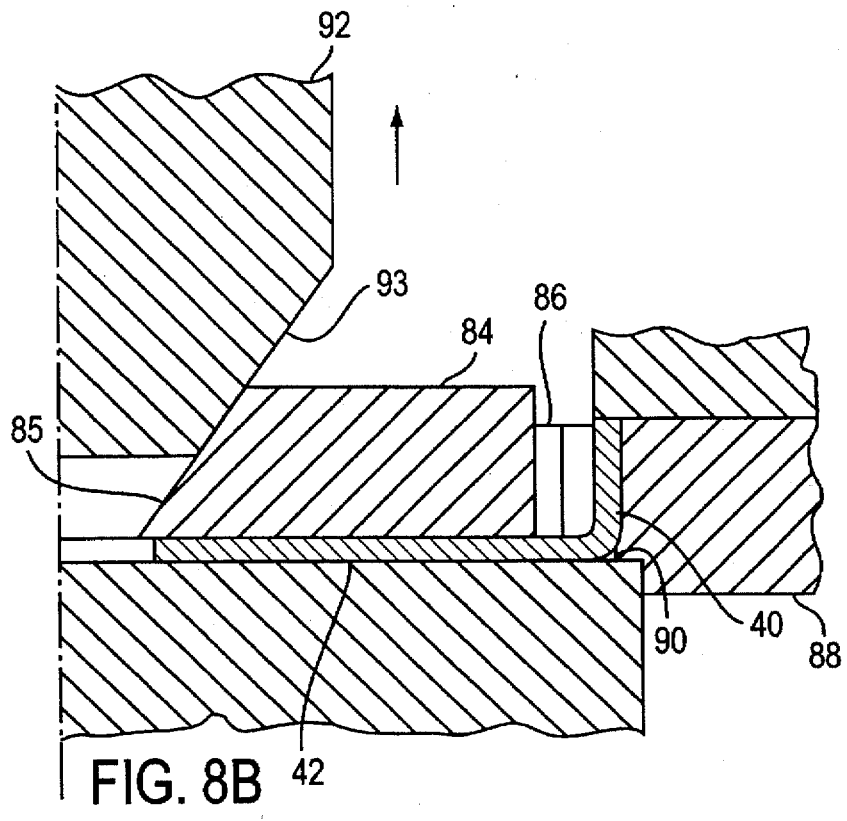

In the fourth step of the method, shown in FIGS. 8A and 8B, internal and external teeth, or splines, are formed by a cam action, horizontal stroke forming operation. The forming operation is performed by a conventional segmented expanding device, which is shown schematically in FIGS. 8A and 8B. An inner die member, having a plurality of radially arranged sliding mandrel segments 84 arranged about a central wedge member 92, is placed inside the annular wall 40 adjacent central wall 42 of the preform. Mandrel segments 84 each have a tooth-forming outer periphery 86. The preform is placed inside an outer die member 88, which has a tooth-forming inner periphery 90 configured so as to mesh with the tooth-forming outer periphery 86 of mandrel segments 84.

The central wedge member 92 is forced downwardly in the direction of the arrow shown in FIG. 8A causing the mandrel segments 84 to move radially outwardly by the interengaged sliding contact of angled surface 93 of central wedge member 92 and angled surface 85 of mandrel segment 84 to cause the outer tooth-forming periphery 86 of mandrel segments 84 to intermesh with the inner tooth-forming periphery 90 of outer die member 88 to form the inner, outer, and side wall sections that define the individual teeth or splines.

As shown in FIG. 8B, when central wedge member 92 is raised in the direction of the arrow in FIG. 8B, mandrel segments 84 are preferably resiliently urged radially inwardly so that mandrel segments 84 and central wedge member 92 can be removed from the inside of the preform.

Alternatively, the internal and external teeth, or splines, could be formed by placing the preform in a rotary holding unit with the annular wall disposed between inner and outer tooth forming tool structures. The inner tooth forming tool structure includes tooth forming elements disposed around the outer periphery thereof, and the outer tooth forming tool structure includes tooth forming elements disposed around the outer periphery thereof. The inner and outer tooth forming tool structures roll in opposite directions about the inner and outer peripheries, respectively, of the annular wall in an intermeshed, synchronized cold forming relation to form exterior tooth surfaces and corresponding interior trough surfaces.

A method for cold forming teeth in the exterior surface of the annular wall of a torque transmitting member is disclosed in U.S. Pat. No. 5,152,061 to Himmeroeder, which is assigned to the assignee of the present invention. Reference may be made to Himmeroeder '061 to supplement the above description.

As shown in FIG. 9, after the formation of outer walls 52, inner walls 54, and side walls 56 during the tooth forming operation described above, radially extending openings 62 are formed in the outer wall of each formed tooth. Each radially extending opening 62 may be formed by a drill or punch indexed sequentially from one outer wall to the next adjacent outer wall. Alternatively, all openings 62 may be formed simultaneously.

Figure 10:
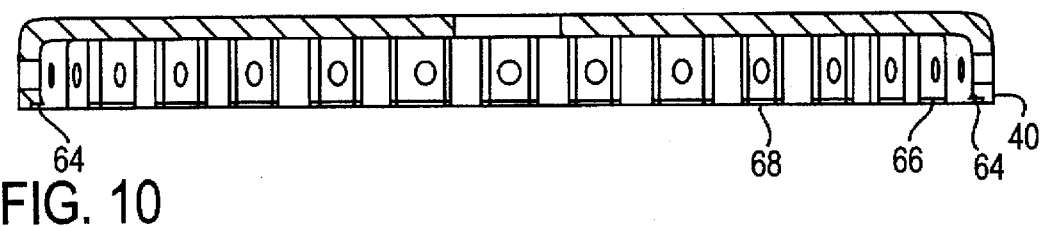
FIG. 10 is a cross sectional view illustrating a sixth step in the method of making the torque transmitting member.

As shown in FIG. 10, in the next step of the preferred method of forming the inner torque transmitting member, stamp depressions 66 and corresponding dam structure 64 are formed in the free end 68 of annular wall 40. Formation of stamp depression 66 and dam structure 64 is shown in more detail in FIGS. 14-16.

The preform is placed in an annular wall holding unit. The annular wall holding unit includes an outer annular wall holding member 96 having an outer periphery formed so as to receive the formed teeth defined by outer walls 52 and side walls 56. Outer annular wall holding member 96 preferably has a thickness corresponding to the overall length of annular wall 40 and includes a surface that is flush with the free end of annular wall 40. An inner annular wall holding member 98 rests atop central wall 42. Inner annular wall holding member 98 has a thickness that is less than the height of annular wall 40 above central wall 42 and has a circular outer periphery, i.e., the outer periphery of inner annular wall holding member 98 does not mesh with troughs 60 of the formed teeth.

With the annular wall 40 secured between inner and outer annular wall holding members 98 and 96, a dam structure forming tool 100 is plunged axially into the free end of the annular wall 40. Dam structure forming tool 100 is preferably circular or annular and includes stamping elements 102, which are preferably at least partially circular, disposed around the periphery of dam structure forming tool 100. When dam structure forming tool 100 is plunged into the free end of annular wall 40, all stamped depressions 66, preferably one associated with each tooth, are formed simultaneously.

It is possible, however, to employ a dam structure forming tool that does not have a continuous dam-forming periphery. In this case one or more dam structures are formed in the stamping process, and the tool is then indexed to a next section to form another dam structure or group of dam structures.

As shown in FIG. 16, the stamp depression 66 formed by dam structure forming tool 100 causes an edge of the trough surface 60 to deform outwardly therefrom so as to define the dam structure 64.

Figure 11:
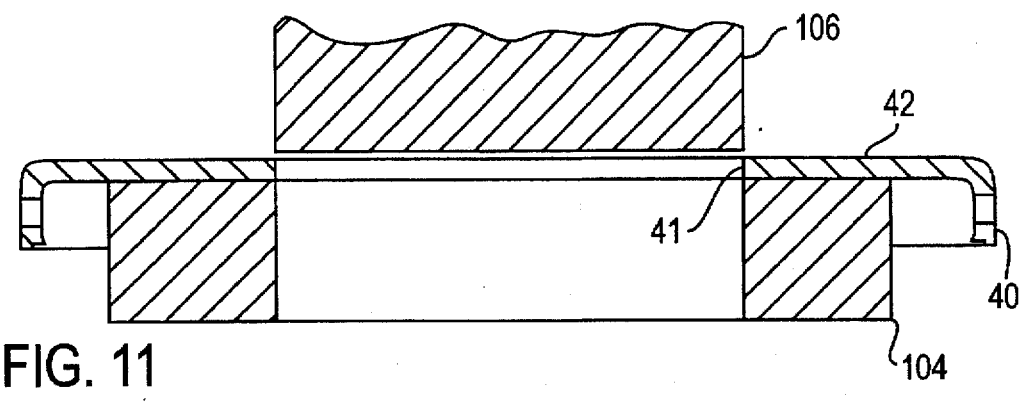
FIG. 11 is a cross sectional view illustrating a seventh step in the method of making the torque transmitting member.

A next step in the method for forming the inner torque transmitting member is shown in FIG. 11. A central aperture 41 is preferably formed by a central plunger 106 axially engaging an annular cutting die 104.

Figure 12:
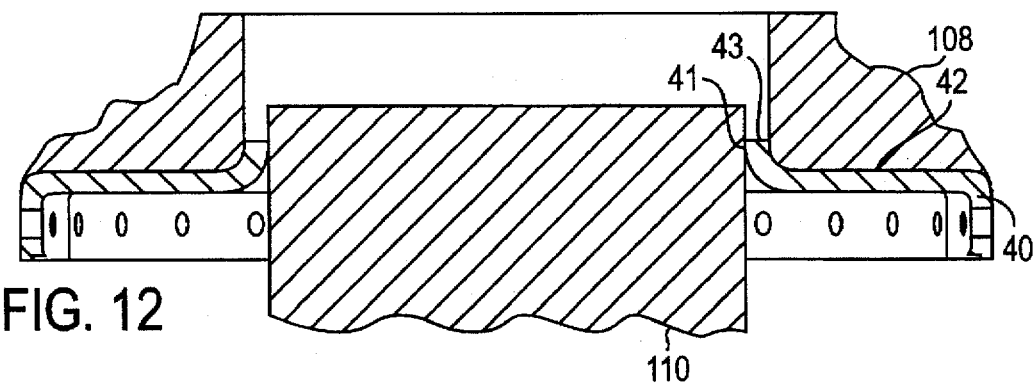
FIG. 12 is a cross sectional view illustrating an eighth step in the method of making the torque transmitting member.

An eighth step in the preferred method of forming the torque transmitting member is shown in FIG. 12. The preform is placed with the top surface of the central wall 42 disposed against an annular die member 108 that is coaxially disposed with respect to center aperture 41. A central plunger 110 having a diameter larger than the diameter of central aperture 41 is moved axially with respect to die 108 so as to engage an inner annulus of the central wall 42 and cold form the inner annulus into a flange 43 extending axially from the inner periphery of central wall 42.

Figure 13:
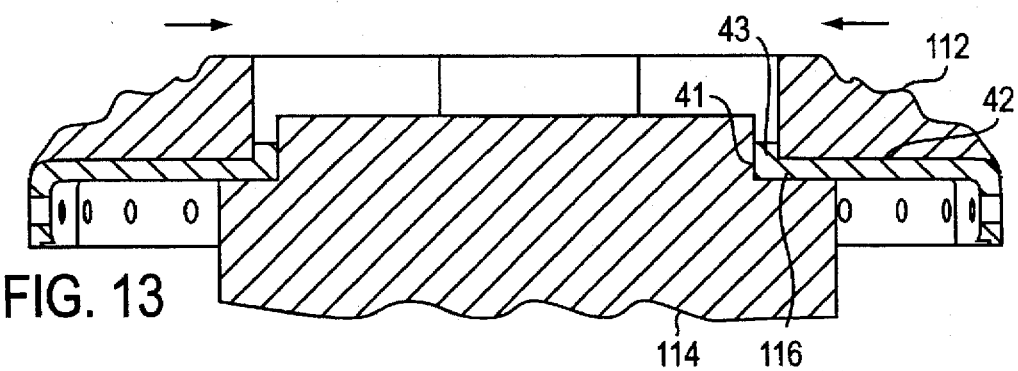
FIG. 13 is a cross sectional view illustrating the ninth step in the method of making the torque transmitting member.
Figure 17:
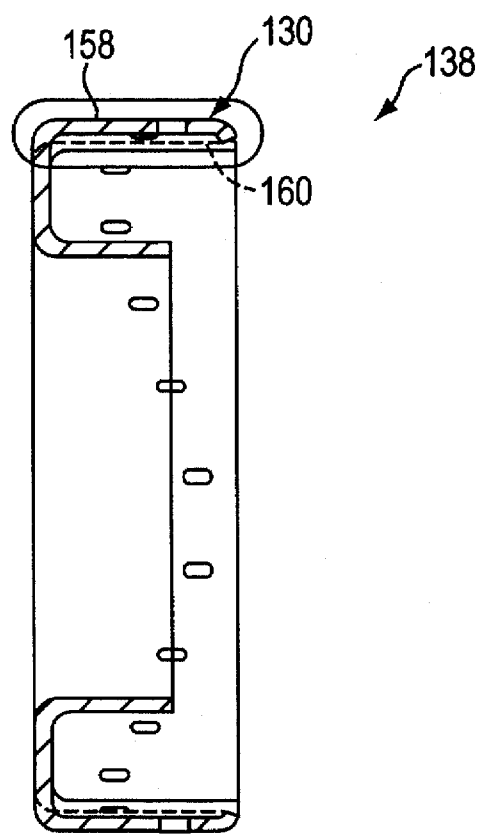
FIG. 17 is an elevational cross section of a prior art torque transmitting member having a lubricant controlling dam structure.
Figure 18:
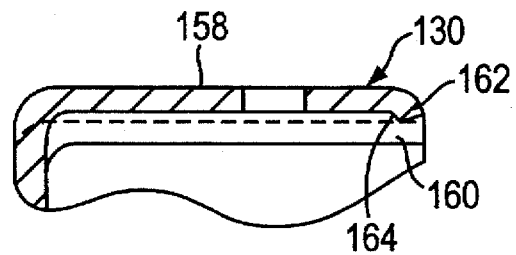
FIG. 18 is an enlargement of the dam structure of the prior art torque transmitting member shown in FIG. 17.

In a final step shown in FIG. 13, the center axial flange 43 is reformed so as to provide a sharp bend between flange 43 and central wall 42. A center circular support 114 preferably having an annual shoulder 116 is disposed within center aperture 41. Flange 43 is reformed by relative lateral forming movement between circular support 114 and an annular outer die member 112.

It will be realized that the foregoing preferred specific embodiment of the present invention has been shown and described for the purposes of illustrating the functional and structural principles of this invention and is subject to change without departure from such principles. Therefore, this invention includes all modifications encompassed within the spirit and scope of the following claims.

What is claimed is:

1. A method for cold-forming an inner torque transmitting member of a plate clutch assembly having a plurality of parallel annular clutch plates disposed in an annular space defined between said inner torque transmitting member and an outer torque transmitting member for axial movement with respect to one another between a relative slipping relationship and an engaged relationship, said method comprising:

cold forming a circular piece of sheet metal into a preform having a radially extending central wall and an annular wall extending axially from an outer periphery of said central wall, said annular wall having a free end;

forming in said annular wall a series of outer wall sections extending axially to said free end, a series of inner wall sections extending axially to said free end, and opposite side wall sections interconnecting adjacent inner and outer wall sections, said outer wall sections and adjacent side wall sections defining a series of axially extending exterior tooth surfaces and corresponding interior trough surfaces, said series of exterior tooth surfaces and corresponding interior trough surfaces being circumferentially separated from one another by said inner wall sections, forming radially extending openings through said outer wall sections of said annular wall, said openings enabling a liquid lubricant fed to said interior trough surfaces to flow outwardly therethrough by centrifugal force to provide lubricant between adjacent faces of the plurality of parallel annular clutch plates disposed radially outwardly of said exterior tooth surfaces; and stamping said free end of said annular wall with a dam structure forming tool at a position spaced radially inwardly from said exterior tooth surfaces to form, at the outer wall sections and adjacent side wall sections, dam structures associated with each of said exterior tooth surfaces and corresponding interior trough surfaces, each dam structure being disposed radially inwardly of the associated exterior tooth surface and extending radially inwardly of the interior trough surface of said outer wall section and extending to the interior trough surfaces of the adjacent side wall sections to control axial flow of the liquid lubricant and retain the liquid lubricant against axial movement beyond the free end of said annular wall.

2. The method of claim 1, wherein said sheet metal is comprised of a steel capable of being cold formed.

3. The method of claim 1, wherein said inner, outer, and side wall sections are formed in said annular wall by a segmented expanding device, and an outer die member, said segmented expanding device including a plurality of radially arranged sliding mandrel segments arranged about a central wedge member and moveable radially outwardly by a vertical linear stroke motion of the central wedge member, each mandrel segment having a tooth-forming outer periphery, said outer die member being disposed about an outer periphery of said annular wall, said outer die member having a tooth-forming inner periphery constructed and arranged to mesh with said tooth-forming outer periphery of said mandrel segments when said mandrel segments are moved radially outwardly by said central wedge member.

4. The method of claim 1 wherein said dam structure forming tool comprises a plunger member having a dam forming periphery constructed and arranged so as to form all of said associated dam structures simultaneously and wherein all of said dam structures associated with each of said exterior tooth surfaces and corresponding interior trough surfaces are formed simultaneously at the outer wall sections and adjacent side wall sections.

* * * * *